US010075838B2

(12) United States Patent
Perez et al.

(10) Patent No.: US 10,075,838 B2
(45) Date of Patent: Sep. 11, 2018

(54) SMART DISCOVERY OF WIRELESS RECEIVERS

(71) Applicant: Microsoft Technology Licensing, LLC, Redmond, WA (US)

(72) Inventors: Michael Perez, Sammamish, WA (US); Mario Barba Garcia, Kirkland, WA (US); Gianluigi Nusca, Seattle, WA (US); Vishal Mhatre, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 15/403,298

(22) Filed: Jan. 11, 2017

(65) Prior Publication Data

US 2018/0152827 A1 May 31, 2018

Related U.S. Application Data

(60) Provisional application No. 62/427,001, filed on Nov. 28, 2016.

(51) Int. Cl.
*H04W 8/00* (2009.01)
*H04L 29/06* (2006.01)
(Continued)

(52) U.S. Cl.
CPC ............ *H04W 8/005* (2013.01); *H04L 65/40* (2013.01); *H04L 67/303* (2013.01);
(Continued)

(58) Field of Classification Search
CPC ..... H04W 8/005; H04W 76/15; H04W 84/12; H04W 76/025; H04L 67/303; H04L 65/40
See application file for complete search history.

(56) References Cited

U.S. PATENT DOCUMENTS 9,386,269 B2 7/2016 Igoe et al.
9,710,214 B2 * 7/2017 Lin ...................... H04W 76/14
(Continued)

FOREIGN PATENT DOCUMENTS

| CA | 2605682 C | 12/2014 |
| EP | 2680500 A1 | 1/2014 |
| EP | 2919431 A1 | 9/2015 |

OTHER PUBLICATIONS

Shah, Jason, "Mediafly: Chromecast Can Replace Cables in the Conference Room", https://www.mediafly.com/news/chromecast-can-replace-cables-in-the-conference-room, Published on: Jan. 12, 2016, 10 pages.
(Continued)

*Primary Examiner* — Marcos Torres

(57) ABSTRACT

The present disclosure discloses automated discovery of and seamless connection to wireless receivers for mirroring, extending, and/or projecting images, audio, and/or video from a computing device to the wireless receivers. A smart discovery program discovers a specific wireless receiver that matches a location for a meeting and provides the user with an option to wirelessly connect to the matching receiver during the meeting. The smart discovery program may also use a current location of the computing device to provide a user with a list relevant wireless receivers. Relevant receivers may include those receivers that are both available and located near the computing device. When a computing device connects to a wireless receiver, it may store the receiver ID for the connected receiver in a local receiver log so that the computing device may use this information to connect to the same receiver at a later time.

20 Claims, 13 Drawing Sheets

(51) Int. Cl.
  *H04W 76/02* (2009.01)
  *H04L 29/08* (2006.01)
  *H04W 76/15* (2018.01)
  *H04W 84/12* (2009.01)

(52) U.S. Cl.
  CPC ......... *H04W 76/025* (2013.01); *H04W 76/15* (2018.02); *H04W 84/12* (2013.01)

(56) References Cited

U.S. PATENT DOCUMENTS

| | | |
|---|---|---|
| 2003/0224807 A1 | 12/2003 | Sinha et al. |
| 2009/0061870 A1* | 3/2009 | Finkelstein ........... H04W 48/20 455/435.2 |
| 2011/0102301 A1 | 5/2011 | Jeon et al. |
| 2013/0229929 A1 | 9/2013 | Linsky |
| 2013/0346564 A1 | 12/2013 | Warrick et al. |
| 2014/0010150 A1 | 1/2014 | Agarwal et al. |
| 2014/0133407 A1 | 5/2014 | Hassan et al. |
| 2014/0141725 A1 | 5/2014 | Jesme et al. |
| 2014/0214471 A1* | 7/2014 | Schreiner, III ..... G06Q 10/1095 705/7.19 |
| 2014/0337492 A1 | 11/2014 | Dubs et al. |
| 2015/0334245 A1 | 11/2015 | Lin et al. |
| 2016/0183317 A1 | 6/2016 | Shao et al. |
| 2016/0205429 A1 | 7/2016 | Ortiz et al. |
| 2016/0212796 A1 | 7/2016 | Wang et al. |

OTHER PUBLICATIONS

"Screen Share Using Airplay Mirroring", https://support.zoom.us/hc/en-us/articles/204726885-Screen-Share-Using-Airplay-Mirroring, Retrieved on: Oct. 18, 2016, 3 pages.

Yankelovich, et al., "Porta-Person: Telepresence for the Connected Conference Room", In Proceedings of Extended Abstracts on Human Factors in Computing Systems, Apr. 28, 2007, pp. 2789-2794.

"International Search Report and Written Opinion Issued in PCT Application No. PCT/US2017/062116", dated Feb. 16, 2018, 14 Pages.

* cited by examiner

SMART DISCOVERY OF WIRELESS RECEIVERS

RELATED CASES

The present application claims priority to U.S. Provisional Patent Application No. 62/427,001, entitled "SMART DISCOVERY OF WIRELESS RECEIVERS," filed on Nov. 28, 2016, now expired.

BACKGROUND

There are several technologies that allow a user to share images, video, and audio from a computing device to a larger screen without wires.

For example, Miracast is a wireless display standard designed for mirroring, extending, and projecting from a smartphone, tablet, or PC's screen to a display device (e.g., a television, monitor, or projector) without requiring any physical cables. Miracast allows devices to discover each other, connect to each other, and mirror, extend, and project the contents of their screens wirelessly. Miracast is designed to be a cross-platform standard.

As standard, Miracast is defined over Wi-Fi Direct. When using typical Miracast over Wi-Fi Direct, a user who wishes to connect to a Miracast receiver will be shown a list of current receivers within the range of Wi-Fi Direct. However, there is no way for a user to distinguish among these wireless receivers unless the receivers have been named using a context-based scheme such as a naming convention that relates to physical location. For example, when a user wishes to connect to a wireless receiver during a meeting there may be no way to determine which receiver to choose unless the receiver ID matches the name of the meeting room or the receiver ID is physically marked on the receiver. In the first instance, naming schemes based on location are difficult to maintain when receivers are moved or removed and as new receivers are added to the system. Even when the receiver is physically labeled, the user must still manually compare the receiver ID on the receiver in the meeting room with the list of in-range receivers shown on the device. Further, users must go through this exercise every time they attend a meeting in that room. As such, there is a need for an improved way to automatically discover the correct wireless receiver to use for a meeting.

This problem is compounded by the risk in inadvertent disclosure of restricted material. For example, connecting to the wrong receiver may risk exposure of confidential, private, or otherwise restricted information to unintended recipients and/or at unintended locations.

Miracast over Infrastructure is an extension of the Miracast standard that allows for use of Miracast over a network, such as an enterprise network. With Miracast over Infrastructure, discovery of wireless receivers occurs differently. Discovery uses mDNS broadcasts that will find all receivers on the local logical subnet with the Miracast sender. However, that logical subnet may span any number of locations that are not within physical proximity of the Miracast sender. As such, a user who wishes to connect to a Miracast receiver may receive too many available receivers to be able to efficiently and correctly choose the right one. As such, there is a need for an improved way to discover the correct or best available wireless receiver using Miracast over Infrastructure.

Miracast over Infrastructure also allows for user devices to connect to any Miracast receiver within the local network including receivers that are part of a different logical subnet than the user device. However, user devices are not capable of discovering receivers located in a different logical subnet even if the device has connected to a particular receiver before. Therefore, there is a need for an improved way for computing devices to connect to Miracast receivers in different subnets.

It is with respect to these and other considerations that examples have been made. Also, although relatively specific problems have been discussed, it should be understood that the examples should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

Examples of the present disclosure provide for automated discovery of and seamless connection to wireless receivers for mirroring, extending, and projecting images, video, and/or audio from a computing device to the wireless receivers. A smart discovery program (e.g., an application or service/daemon) discovers a specific wireless receiver that matches a location for a meeting and provides the user with an option to wirelessly connect to the matching receiver during the meeting. The smart discovery program may temporarily store the matching receiver in a local receiver log on the client device so that the user may easily connect to the matching receiver at any time during the duration of the meeting. A server may maintain a receiver log that includes entries matching meeting locations to wireless receivers. When the smart meeting application detects that a meeting has started or is about to start, it may send a request to the server to identify a matching receiver for the meeting.

In aspects of the present invention, a computing device is capable of connecting to a plurality of wireless receivers and the smart discovery application or service/daemon uses a current location of the computing device to provide a user with a list relevant wireless receivers. Relevant receivers may include those receivers that are both available and located near the computing device.

When a user requests to connect the computing device to a wireless receiver, the smart application or service/daemon may determine whether or not the user has an appointment at the time of the request. If there is an ongoing appointment, the system may identify a specific wireless receiver that matches the location of the meeting and prompt the user to connect to the matching wireless receiver. If the user does not have an ongoing or imminent meeting, the system may use a current location of the computing device to provide the user with a list of relevant wireless receivers.

When a computing device connects to a wireless receiver, it may store the receiver ID for the connected receiver in a local receiver log so that the computing device may use this information to connect to the same receiver at a later time. The computing device may also send the receiver ID and its associated location, if available, to a server for storage in a receiver log. This server receiver log may be used to provide a user with a matching receiver for a meeting at a later time.

In aspects of the present disclosure, the computing devices and the wireless receivers are Miracast-compatible and may connect to each other using a Miracast protocol.

BRIEF DESCRIPTION OF THE DRAWINGS

Non-limiting and non-exhaustive examples are described with reference to the following figures.

DETAILED DESCRIPTION

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Figure 1:
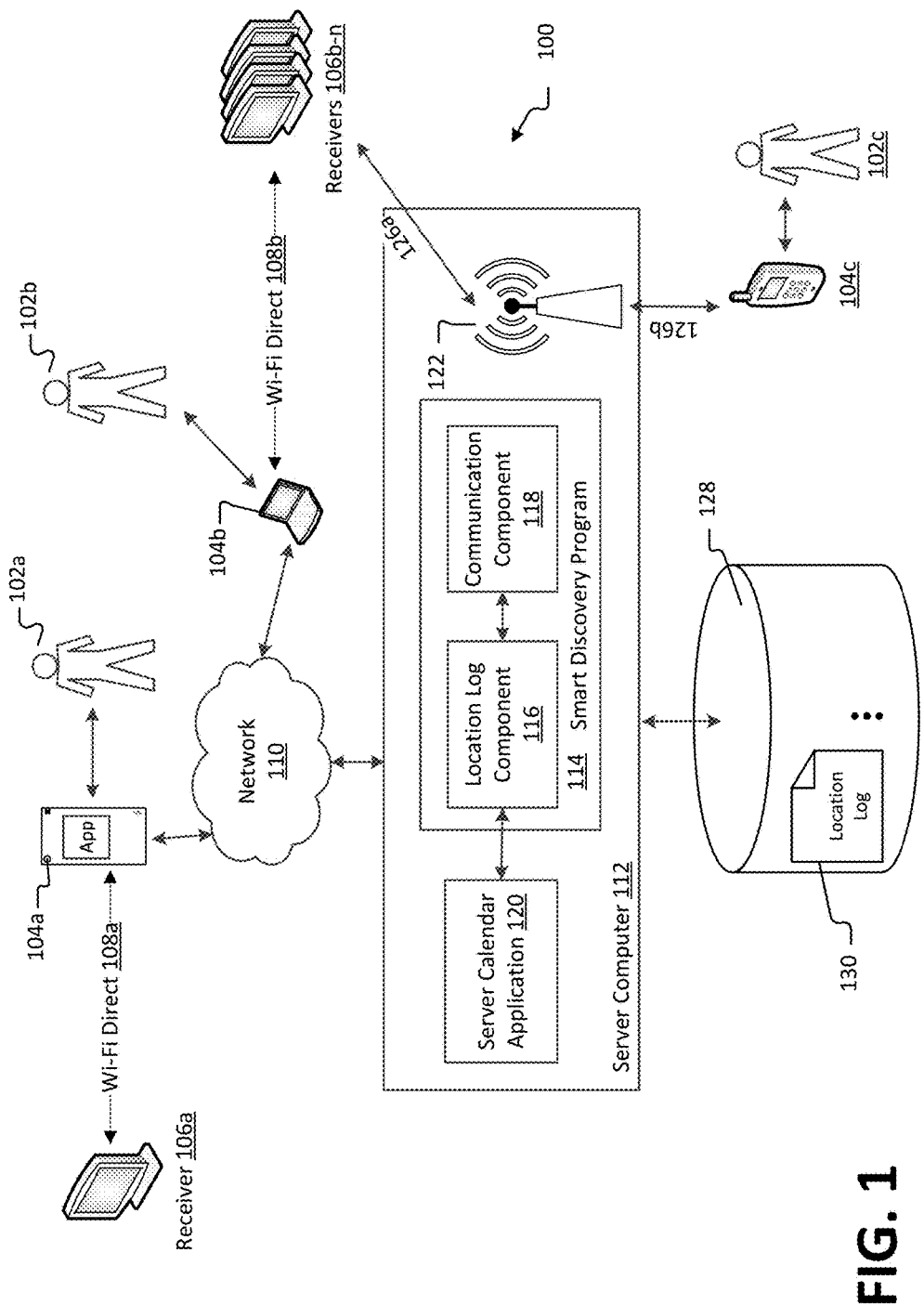
FIG. 1 is a simplified block diagram of a distributed computing system in which aspects of the present disclosure may be practiced.

FIG. 1 illustrates one example of an architecture for a system for discovering wireless receivers, such as Miracast receivers, according to embodiments of the present invention. Miracast is able to use the peer-to-peer Wi-Fi Direct standard, which allows for sending up to 1080p HD video (H.264 codec) and 5.1 surround sound (AAC and AC3 are optional codecs, mandated codec is linear pulse-code modulation –16 bits 48 kHz 2 channels). The connection is created via WPS and therefore is secured with WPA2. IPv4 is used on the internet layer. On the transport layer, TCP or UDP are used. On the application layer, the stream is initiated and controlled via RTSP, RTP for the data transfer.

As illustrated, system 100 may include one or more client computing devices 104 (e.g., device 104a, device 104b, and device 104c) connected to one or more servers 112 over a network 110 and one more receivers 106 (e.g., receiver 106a, and receivers 106b-n) that may or may not be connected to the network 110.

In a basic configuration, the one or more client computing devices 104 are personal or handheld computers having both input elements and output elements operated by one or more users 102 (e.g., user 102a, user 102b, and user 102c). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. The computing devices 104 may be Miracast-compatible. Any suitable client computing device for executing a smart discovery program (e.g., an application or daemon) and/or remotely connecting to network 110, server 112 and/or receivers 106 will work.

The network 110 may be a computer network such as an enterprise intranet and/or the Internet. In this regard, the network 110 may include a Local Area Network (LAN), a Wide Area Network (WAN), the Internet, wireless and wired transmission mediums. In further aspects, server computing device 112 may communicate with some components of the system via a local network (e.g., an enterprise intranet), whereas server computing device 112 may communicate with other components of the system via a wide area network (e.g., the Internet). In addition, the aspects and functionalities described herein may operate over distributed systems (e.g., cloud-computing systems), where application functionality, memory, data storage and retrieval, and various processing functions may be operated remotely from each other over a distributed computing network, such as the Internet or an intranet.

The receivers 106 are wireless and may be any device that is capable of wirelessly receiving images, videos, and other display data from devices 104 and displaying (e.g., mirroring) the display data that they receive.

The computing devices 104 may connect to receivers 106 in a variety of ways. The devices 104 may connect to receivers 106 wirelessly via Wi-Fi and/or Wi-Fi Direct. If they are Miracast compatible, they may connect directly to a Miracast-compatible device using Miracast over Wi-Fi as is shown by the Wi-Fi Direct dashed line 108a between device 104a and receiver 106 and the Wi-Fi Direct dashed line 108b between receivers 106b-n and device 104b. Or clients 104 may connect to receivers 106 through an access point 122 as shown by arrows 126a and 126b that connect client 104c through access point 122 at server 112 to receiver 106b.

As illustrated by FIG. 1, a server version of a smart discovery program 114 is implemented by a server computing device 112. The smart discovery program 114 capable of automatically identifying the best available wireless receiver(s) 206 for clients 104 based on a number of factors including the particular user, the particular device, the current time, and the current location. As should be appreciated, the server version of smart discovery program 114 may also be implemented in a distributed environment (e.g., cloud-computing environment) across a plurality of server computing devices (not shown). Moreover, as should be appreciated, either a client or a server version of the smart discovery program may be capable of discovering the intended or best available wireless receiver(s). While a server version of the smart discovery program 114 and associated components 116-118 are shown and described, this should not be understood as limiting. Rather, a client version of smart discovery program 102 may similarly implement components 116-118 on a client computing device 104.

The smart discovery program 114 may be implemented on a server computing device 112 to assist devices 104 via network 110 in discovering and connecting to the best available receiver 106. For example, the smart discovery program 114 may be configured to perform methods illustrated in and described below with reference to FIGS. 5 and 6. In a basic configuration, server computing device 112 may include at least a processing unit and a system memory for executing computer-readable instructions. In some aspects, server computing device 112 may comprise one or more server computing devices 112 in a distributed environment (e.g., cloud-computing environment).

The smart discovery program 114 may include various components for discovering wireless receivers for devices 104, including a location log component 116 and a communication component 116. In aspects, each component may communicate and pass data between the other components. Server 112 may also include a server version of a calendar application 120. These various components may be implemented using hardware, software, or a combination of hardware and software. Moreover, the various components may be executed on a single server computing device (e.g., server computing device 112), on multiple server computing devices, or locally on a client computing device (e.g., client computing device 104).

The location log component 116 creates, searches, and maintains a location log 130 that maps physical locations to associated receivers as described with reference to FIGS. 5 and 6. The communication component 118 may receive one or more communications relating to the receiver log. In aspects, communication component 114 may detect that a communication is related to the location log component 115 based on analyzing terms used in the message (e.g., within the subject field of the message, the message body, etc.) and/or by recognizing that attachments to the message are related to the location log 130. As should be appreciated, communication component 114 may receive one or more communications relating to a wireless receiver and/or location log by any suitable means. The above examples are provided for purposes of explanation should not be considered to be limiting.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
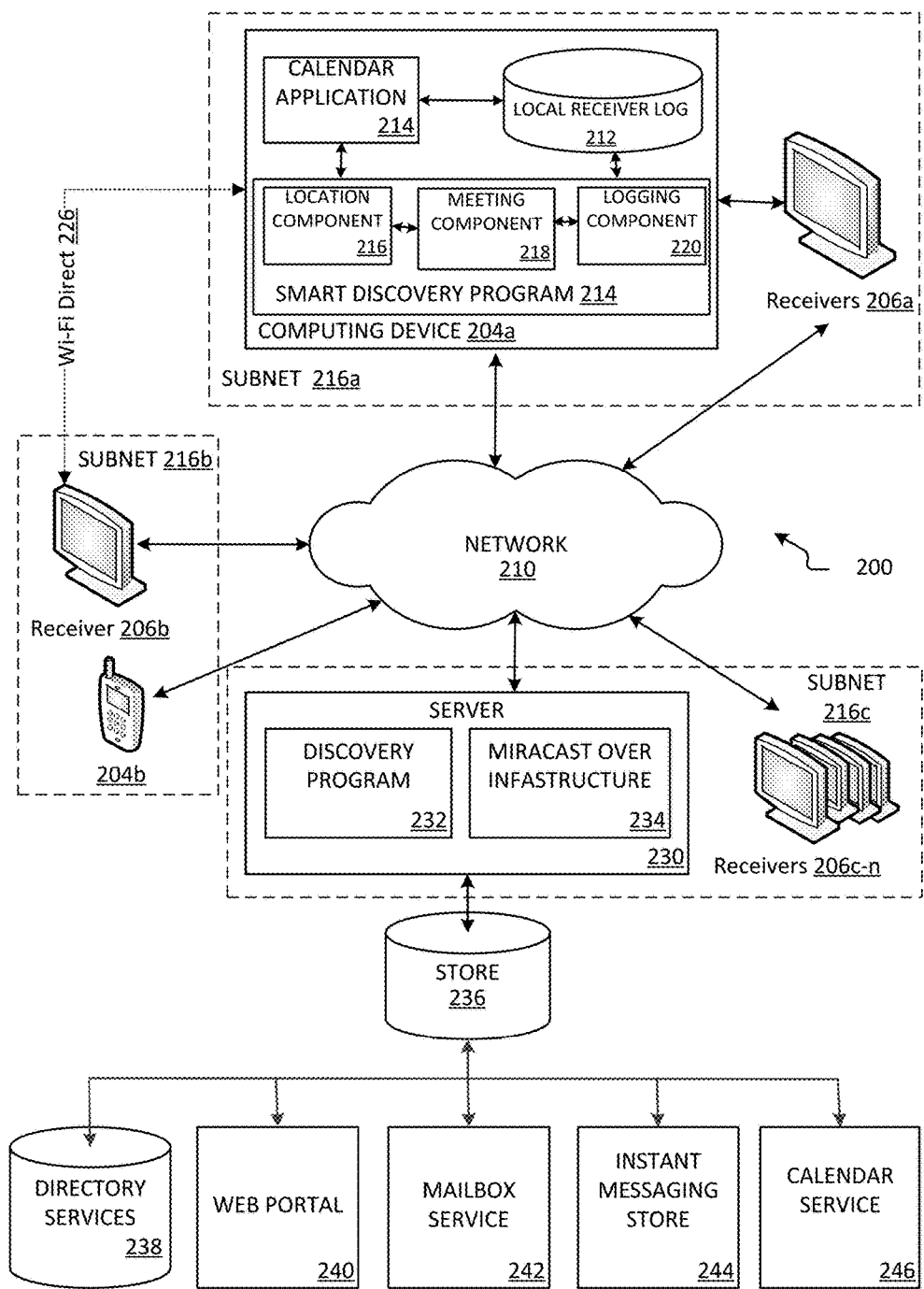
FIG. 2 is a simplified block diagram of a distributed computing system in which aspects of the present disclosure may be practiced.

FIG. 2 illustrates another exemplary architecture for a system for discovering wireless receivers, such as Miracast receivers, that may use Miracast over Infrastructure according to embodiments of the present invention. As illustrated, system 200 may include one or more Miracast-compatible computing devices 204 (e.g., client 204a and 204b), connected to one or more servers 230, and one or more Miracast-compatible receivers 106 (e.g., 106a, 106b, and 106c-n) over one or more networks 210.

The computing devices 204, server 230, and receivers 206 may be divided into logical subnets 216 (e.g., subnet 216a, 216b, and 216c). For example, client 204a and receiver 206a are assigned to subnet 216a, whereas receiver 206b and device 104b are assigned to subnet 216b, and server 230 and receivers 206c-n are assigned to subnet 216c.

As with FIG. 1, the computing devices 204 in FIG. 2 may connect with receivers 206 in a variety of ways including via wireless access through wireless networks, Wi-Fi Direct (such as with Miracast over Wi-Fi), and over network 210 using Miracast over Infrastructure via 210. For example, computing device 204a is in Wi-Fi Direct range (shown by dotted arrow 226) of a wireless receiver 206b and they may discover each other and connect via Miracast over Wi-Fi.

Additionally, all of the devices 204 in system 200 may connect to all of the receivers 206 in system 200 through network 210 using Miracast over Infrastructure, which may be managed by an associated application 234 on server 230. However, Miracast over Infrastructure allows discovery of devices and receivers only for those elements that are located within the same local logical subnet. For example, computing device 204a. Device 204b may discover receiver 206b but not receiver 206a. Further, while device 204a may connect to receivers 206c-n over network 210, device 204a is not capable of discovering any of the receivers 206c-n.

The computing devices 204 may execute a client version of a smart discovery program 214 capable of automatically identifying the best available wireless receiver(s) 206 based on a number of factors including the particular user, the particular device, the current time, and the current location. Further client application 214 may practice methods illustrated by and described with reference to FIGS. 3A, 3B, 4, and 6-8.

In some examples, the smart discovery program 214 may execute locally on a client computing device 204. In other examples, a smart discovery program (e.g., a mobile app on a thin client computing device 204) may operate in communication (e.g., via network 210) with a corresponding server version of smart discovery program 232 executing on one or more server computing devices, e.g., server computing device 230. In still other aspects, rather than executing a client version of a smart discovery program, the one or more client computing devices 204 may remotely access, e.g., via a browser over network 210, the smart discovery program 232 implemented on the server computing device 230, or multiple server computing devices (e.g., in a distributed computing environment such as a cloud-computing environment). In aspects, the smart discovery program, whether executed on a client, a server, or in a cloud-computing environment, may be integrated into an operating system or the like.

The computing device 204 may also access content from a server device 230 that may be stored in different communication channels or other storage types. For example, various documents and content may be stored using a directory service 238, a web portal 240, a mailbox service 242, an instant messaging store 244, or a calendar service 246. The smart discovery program 214 may be employed by a client that communicates with server device 230 and/or the smart discovery program 232 may be employed by server device 230. The server device 230 may provide data to and from a client computing device 204 through a network 210. Any of these embodiments of the computing devices may obtain content from the store 236.

As should be appreciated, FIG. 2 is described for purposes of illustrating the present methods and systems and is not intended to limit the disclosure to a particular sequence of steps or a particular combination of hardware or software components.

Automatic Discovery of the Correct Wireless Receiver for a Scheduled Appointment FIGS. 3A, 3B, 4-6 illustrate various methods for automatically discovering the correct wireless receiver for a scheduled appointment in accordance with embodiments of the present invention. These methods involve user devices and receivers that may be, but do not have to be, Miracast-compatible. As should be appreciated, FIGS. 3A, 3B, and 4-6 are described for purposes of illustrating the present methods and systems and are not intended to limit the disclosure to a particular sequence of steps or a particular combination of hardware or software components.

Figure 3A:
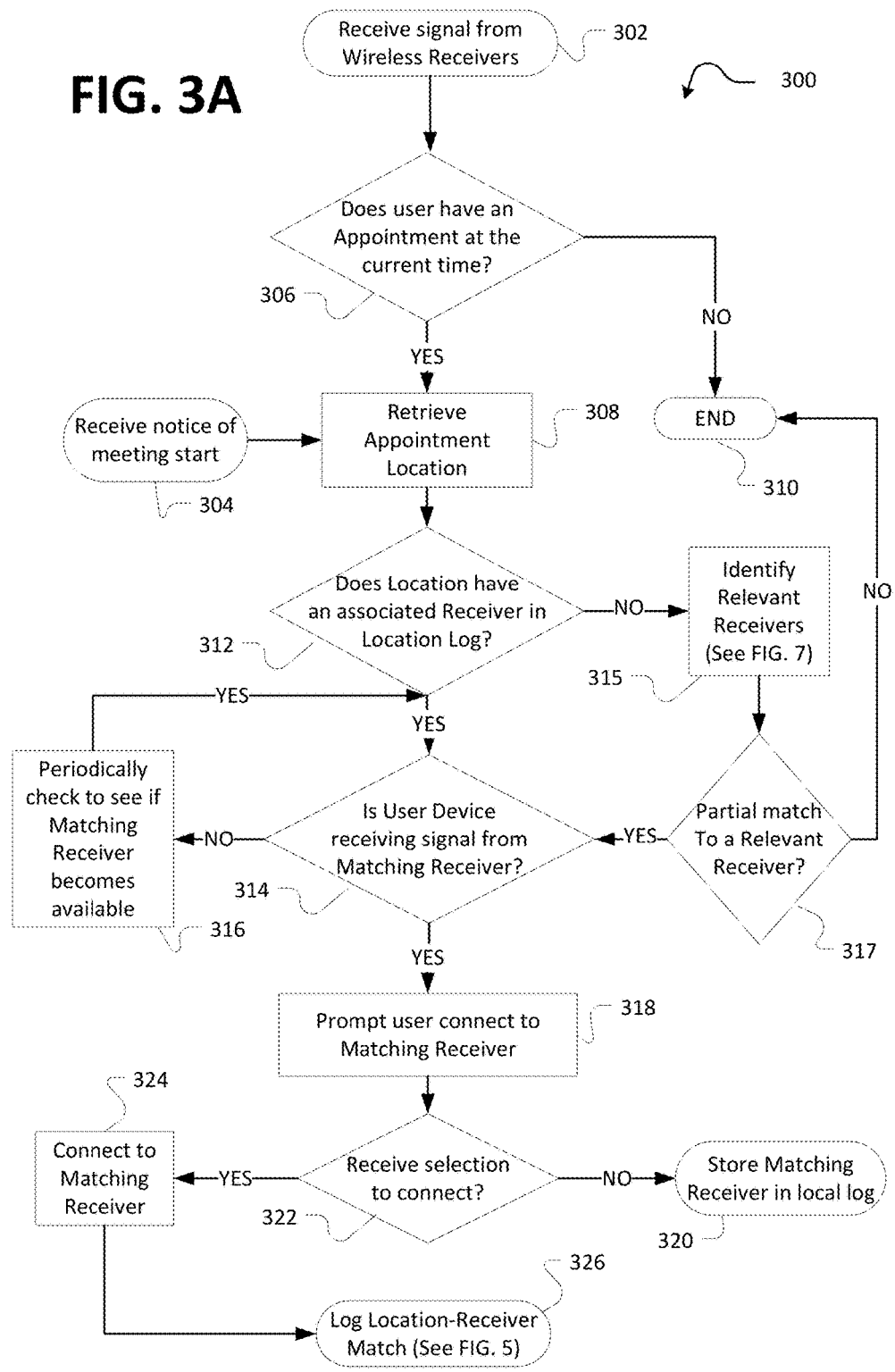
FIG. 3A illustrates an exemplary method for discovering a wireless receiver for an appointment in accordance with embodiment of the present invention.
Figure 3B:
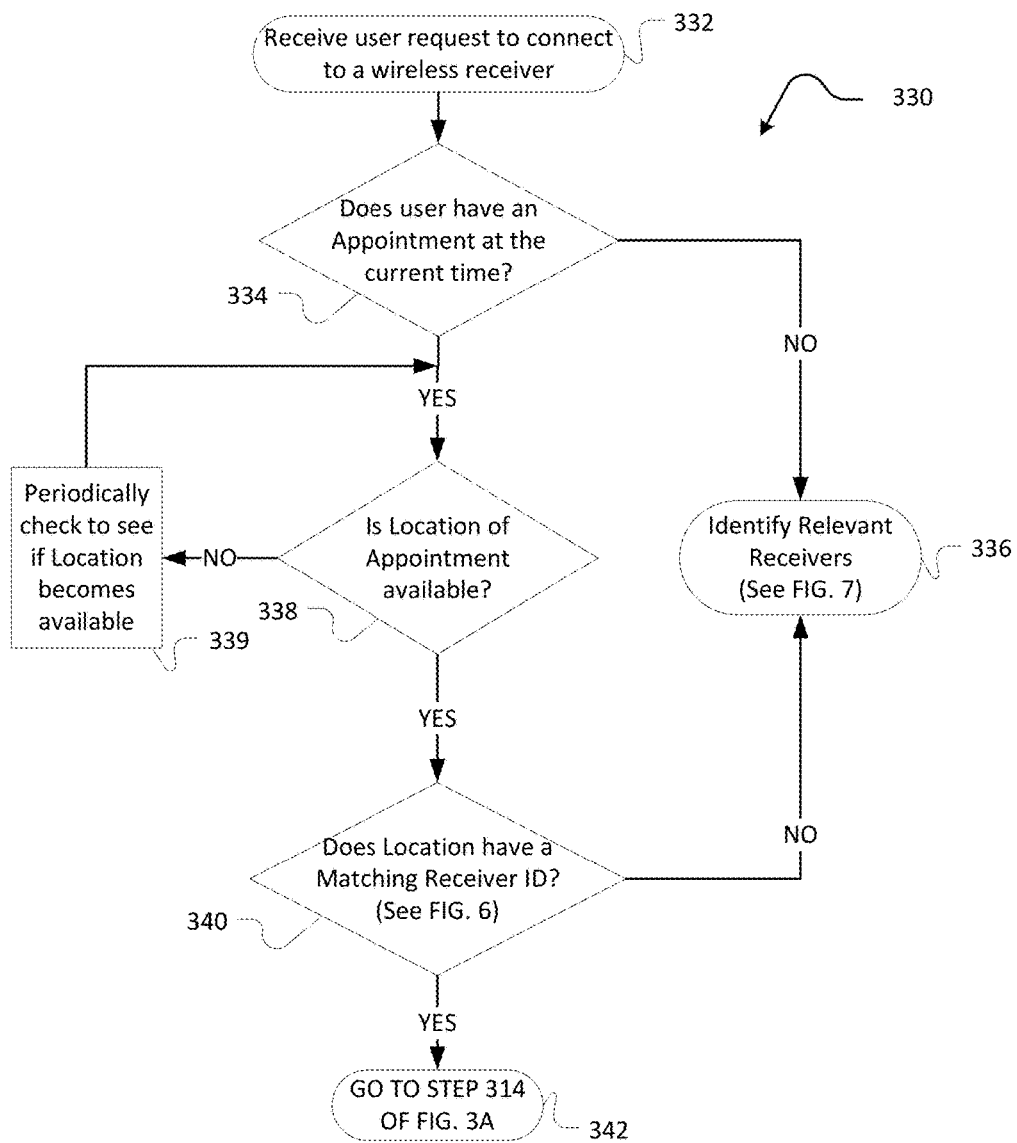
FIG. 3B illustrates an exemplary method for discovering a wireless receiver for an appointment in accordance with another embodiment of the present invention.

FIGS. 3A and 3B illustrate exemplary methods 300 and 330 performed at a user device (such as computing devices 104 in FIG. 1 and devices 204 in FIG. 2) for automatically discovering the correct wireless receiver (such as receivers 106 in FIGS. 1 and 206 in FIG. 2) in a location where an appointment (such as a meeting) is scheduled. These methods may be performed by the smart discovery program 214, and more particularly by the smart meeting component 218, in conjunction with calendar application 214 on device 204a in FIG. 2 and/or calendar service 246. The user device (e.g., the discovering device) and the wireless receiver may be, but do not have to be, Miracast-compatible.

In FIG. 3A, method 300 automatically discovers the appropriate wireless receiver for an appointment, meeting, or other calendar event for a user who is associated with a user device. Method 300 may begin at either step 302 or step 304. If the method begins at operation 302, it moves to operation 306 where it determines whether the user has a meeting at the current time. This may be determined by a calendar application (such as calendar application 214 and/or calendar service 246) and/or by a meeting component 218 of the smart discovery program 214. The calendar application may determine a current time and compare the current time to entries within a user's calendar for the current time. In aspects, the system further considers not only meetings that overlap the current time, but also meetings that fall within a certain window (such as 15 minutes) of the current time. If the user does not have a meeting scheduled ("NO" at 306), method 300 terminates at step 310. If, on the other hand, there is a meeting that is happening or is about to happen ("YES" at 306), the method proceeds to operation 308.

Method 300 may also begin at step 304 when the smart meeting application receives a notification that an appointment or meeting has started or is going to start soon. The user device may have a calendar or scheduling application that keeps track of meetings, appointments, and other calendar objects, such as calendar application 214 of user device 204a in FIG. 2 that may work in conjunction with calendar service 246 in FIG. 2. If so, method proceeds to operation 308.

At operation 308, method 300 retrieves the location for the appointment. In aspects, the smart discovery program may retrieve this information from a calendar application or the calendar application may send the meeting location with the notice that a meeting is starting or about to start. In another embodiment, the meeting location may be contained in an invitation for the meeting. In aspects, if the location for the meeting cannot be retrieved, the method proceeds to step 336 of FIG. 3B.

Next, method 300 determines whether the meeting location has an associated receiver in a location log. In aspects, the smart discovery program may make this determination by looking up the location identifier learned from step 308 to see if there is an entry in a location log for that location, and if so by retrieving the receiver ID that is associated with that location in the log. The location log may be stored locally on a computing device, such as in local receiver log 212 on computing device 204a, and/or stored at a server, such as location log 130 in store 128 for server 112 in FIG. 1. If there is no entry for the location in a location log or if the entry is present but does not include an associated receiver ("NO" at 312), method 300 identifies available receivers or relevant receivers using the method shown in FIG. 7 in step 315 and then attempts to find a partial match between the meeting location name and the receiver name in step 317. If it finds a partial match ("YES" at 317), the method proceeds to step 314. If not ("NO" at 317), the method terminates at 310. If, on the other hand, the log includes an entry for the location and identifies a matching receiver ("YES" at 312), method 300 moves to operation 314.

At 314, method 300 determines whether the user device is receiving a signal from the matching receiver. If method 300 determines that the user device is not receiving a signal from the matching receiver ("NO" at 314), it proceeds to step 316 where it periodically checks to see if the Matching Receiver becomes available.

If it is receiving a signal ("YES" at 314), the user device prompts the user to connect to the matching receiver at step 318. The prompt may be in a format that notifies the user that there is a matching receiver for the appointment in question. The prompt may also include an option for the user to select to be connected to the matching wireless receiver to share the information presented on the user device with the matching receiver. If the user chooses to connect ("YES" at 322), the user device is connected to the wireless receiver at step 324. Method 300 then terminates at step 326, where the matching receiver may be logged as illustrated in FIG. 5. If the user chooses not to connect ("NO" at 322), method 300 moves to step 320 where the matching receiver is stored in a local receiver log, such as log 212 in FIG. 2, for the duration of the meeting so that the user may easily connect to share the user device screens later in the meeting, if desired.

FIG. 3B illustrates another exemplary method 330 for automatically discovering the right wireless receiver for an appointment, meeting, or other calendar event for a user who is associated with a user device. It begins at step 332 where the user device has received a request from a user to share the device screen with a wireless receiver. At step 334, method 330 determines whether the user has a meeting at the current time. This may be determined by a calendar application and/or by a meeting component of the smart discovery program as discussed in more detail with regard to FIG. 3A. If the user does not have a meeting scheduled ("NO" at 334), method 330 terminates at 336 where it may begin method 700 for identifying the most relevant receivers in accordance with an embodiment of the present invention.

If the user does have a current meeting or has a meeting that is about to begin ("YES" at 334), the method proceeds to operation 338. At operation 338, method 330 determines whether the location for the appointment is available. If the location is not available, method 330 proceeds to step 339 where it periodically checks to see if the location has become available. In an alternative aspect, if the location of the meeting is not available at step 338, the method proceeds to step 336. If the location of the meeting is available ("YES" at 338), step 340 determines whether the meeting location has a matching receiver ID through a process which is shown in more detail in FIG. 6.

Figure 6:
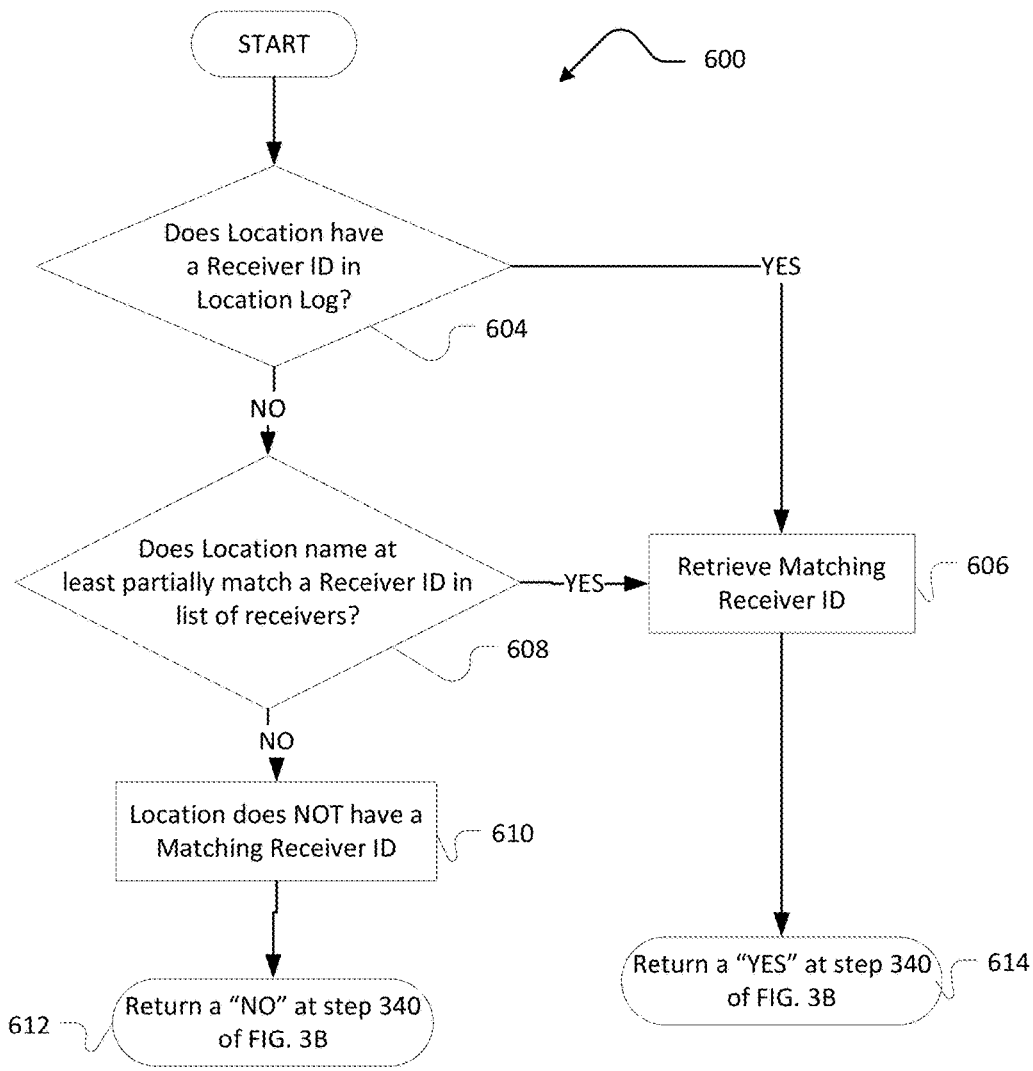
FIG. 6 illustrates an exemplary method for determining whether a meeting location has a matching receiver in accordance with embodiments of the present invention.

FIG. 6 illustrates a method 600 for determining whether a meeting has a matching receiver in accordance with embodiments of the present invention. Method 600 may be performed by a client version of the smart discovery program on a computing device, such as devices 104 of FIG. 1 and devices 204 of FIG. 2, and/or by a server version of this application on a server, such as server 112 in FIG. 1 and server 230 in FIG. 2. At step 604, the smart discovery program consults a location log to determine whether there is an entry that matches the location for the appointment. It may retrieve this information from a local log, such as local receiver log 212 on computing device 204a in FIG. 2, or from a server log, such as location log 130 in store 128 for server 112 in FIG. 1. Either way, if the appointment location has an entry in a log and the entry contains an associated receiver ("YES" at 604), the method proceeds to step 606 where the matching receiver ID is retrieved from the location log. Method 600 terminates at step 614, where it may return an answer of "YES" to step 340 of FIG. 3B.

If the location does not have an entry in a location log or there is no matching receiver for that location in the log ("NO" at 604), a determination is made as to whether the location name or identifier for the appointment matches a name from a list of receivers at step 608. The list of receivers may include all wireless receivers that are within Wi-Fi range of the user device, or all wireless receivers that are within the same local subnet as the user device (using Miracast over Infrastructure), or all relevant receivers that may be obtained through an embodiment of the present invention illustrated in FIG. 7. Step 608 compares the location identifier with the receiver identifier to see if they at least partially match. For example, if a meeting location is a conference named "27/2705", the system will search the list of receivers to see if any receiver ID's at least partially match the location identifier. If one of the receivers has and ID "2705", a string comparison would consider this to be a match and retrieve the receiver ID. If there is a match ("YES" at 608), method 330 moves to step 606 where it selects the matching receiver and retrieves the matching receiver ID at step 606. Method 600 terminates at step 614, where it may return an answer of "YES" to step 340 of FIG. 3B.

If the location identifier does not match any of the identifiers for any of the receivers on the list of receivers ("NO" at 608), method 600 concludes that the appointment location does not have a matching receiver at step 610 and terminates at step 612 where it returns an answer of "NO" at step 340 of FIG. 3B.

Returning to FIG. 3B, if there is not a matching receiver ("NO" at 340), method 330 terminates at 336 where it may begin method 700 for identifying relevant receivers in accordance with an embodiment of the present invention. If there is a matching receiver ("YES" at 340), method 330 then proceeds to step 314 of FIG. 3A as described above with reference to steps 314-326 of FIG. 3A.

Figure 4:
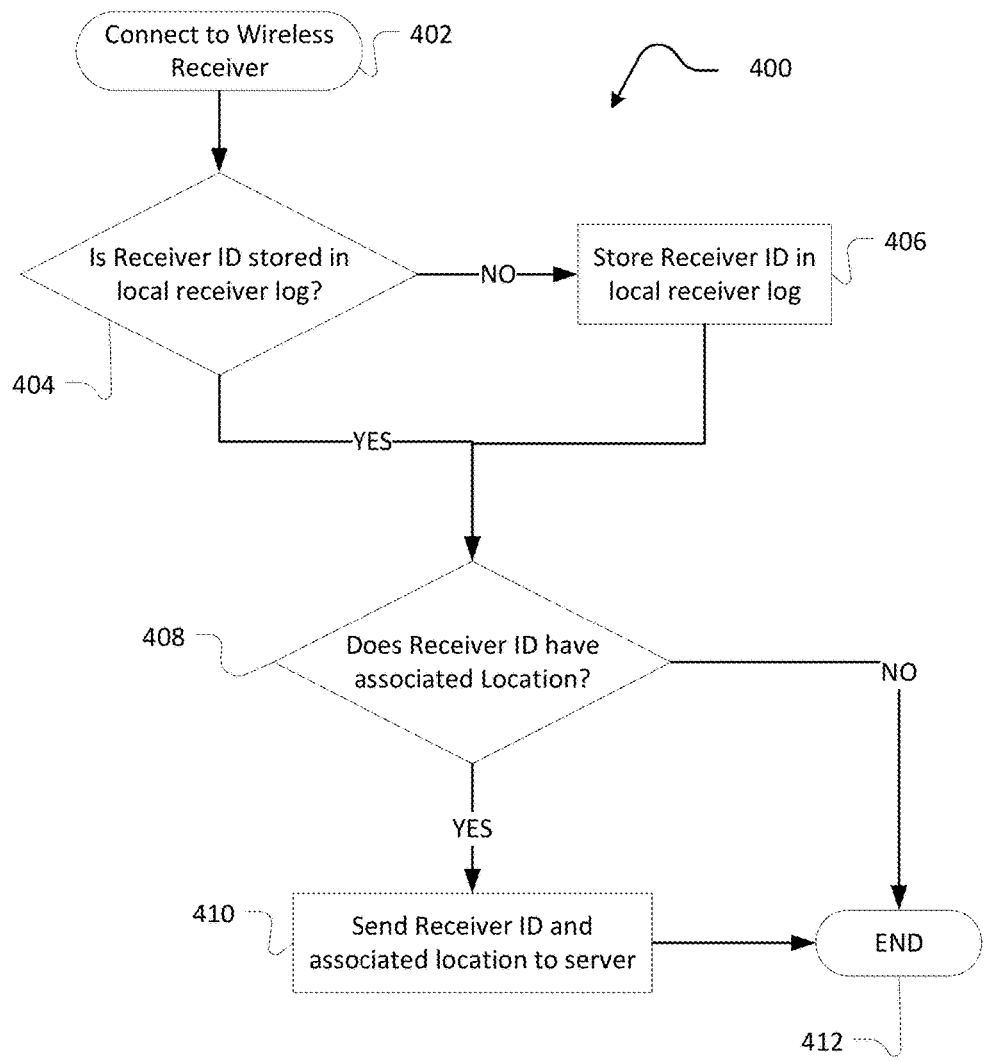
FIG. 4 illustrates an exemplary method for logging matching receivers and locations by a computing device in accordance with embodiments of the present invention.

FIG. 4 illustrates a method 400 for logging matching receivers and locations by a computing device in accordance with an embodiment of the present invention. Method 400 may be performed by the smart discovery program 214, and more particularly by the logging component 220 of this application on device 204a in FIG. 2. Method 400 begins at step 402 when a user device connects to a wireless receiver. At step 404, the smart discovery program determines whether the ID for the connected receiver is stored in a local receiver log, such as log 212 in FIG. 2, of the user device. If there is not an entry in the local log ("NO" at 404), the connected receiver ID is stored at step 406 and the method moves to step 408. If there is an entry for the connected receiver in the local log ("YES") at 404, the method moves to step 408.

At step 408, method 400 determines whether there is a location associated with the connected receiver. For example, if the system determined that the connected receiver has a name that at least partially matches the name of the location, for example as described with reference to step 608 of FIG. 6, then the receiver does have an associated location ("YES" at 408). At step 410, the receiver ID and associated location are sent to the server to be stored in a server location log, such as log 130 in FIG. 1, and the method terminates at 412. If there is not an associated location, method 400 terminates at 412.

Figure 5:
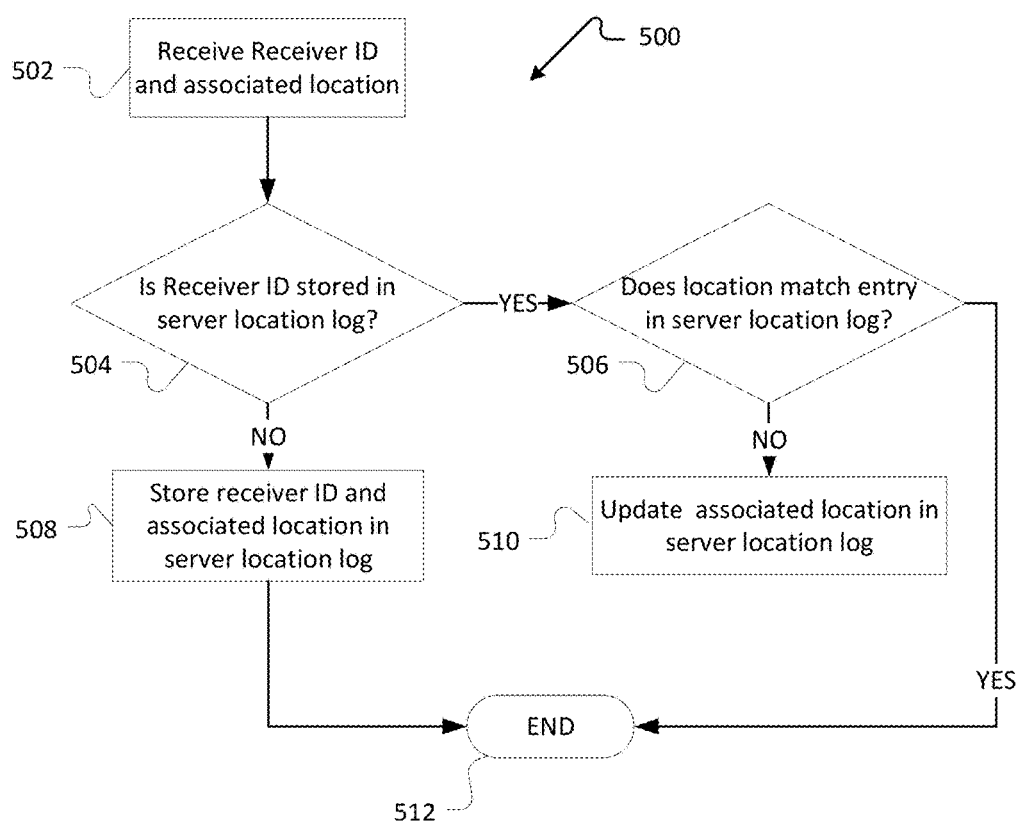
FIG. 5 illustrates an exemplary method for logging matching receivers and locations by a server computing device in accordance with embodiments of the present invention.

FIG. 5 illustrates another method 500 for logging matching receivers and locations by a server in accordance with an embodiment of the present invention. Method 500 may be performed by the server version of the smart discovery program 114, and more particularly by the location log component 116 of this application on server 112 in FIG. 1.

Method 500 begins at step 502 where the server receives a receiver ID and associated location ID from a user device, such as that shown by step 410 of FIG. 4. At step 504, the server determines whether the receiver ID has already been stored in the server location log, such as log 130 in FIG. 1. If so ("YES" at 504), the method proceeds to step 506 where it determines whether the location that is associated with this receiver ID in the log matches the location received from the user device. If so ("YES" at 506), method 500 ends at 512. If the location that is associated with this receiver ID in the log does not match the location received from the user device, the entry for this receiver in the log may be updated to match the information received from the user device at step 510. In another embodiment, the system may not update the location log but rather keep the information as stored in the server log.

If there is no entry in the server log for the receiver ID ("NO" at 504), a new entry is created for the receiver ID and the associated location in the server log at step 508. The method ends at 512.

Smart Discovery of Wireless Receivers for
Miracast over Infrastructure

Figure 7:
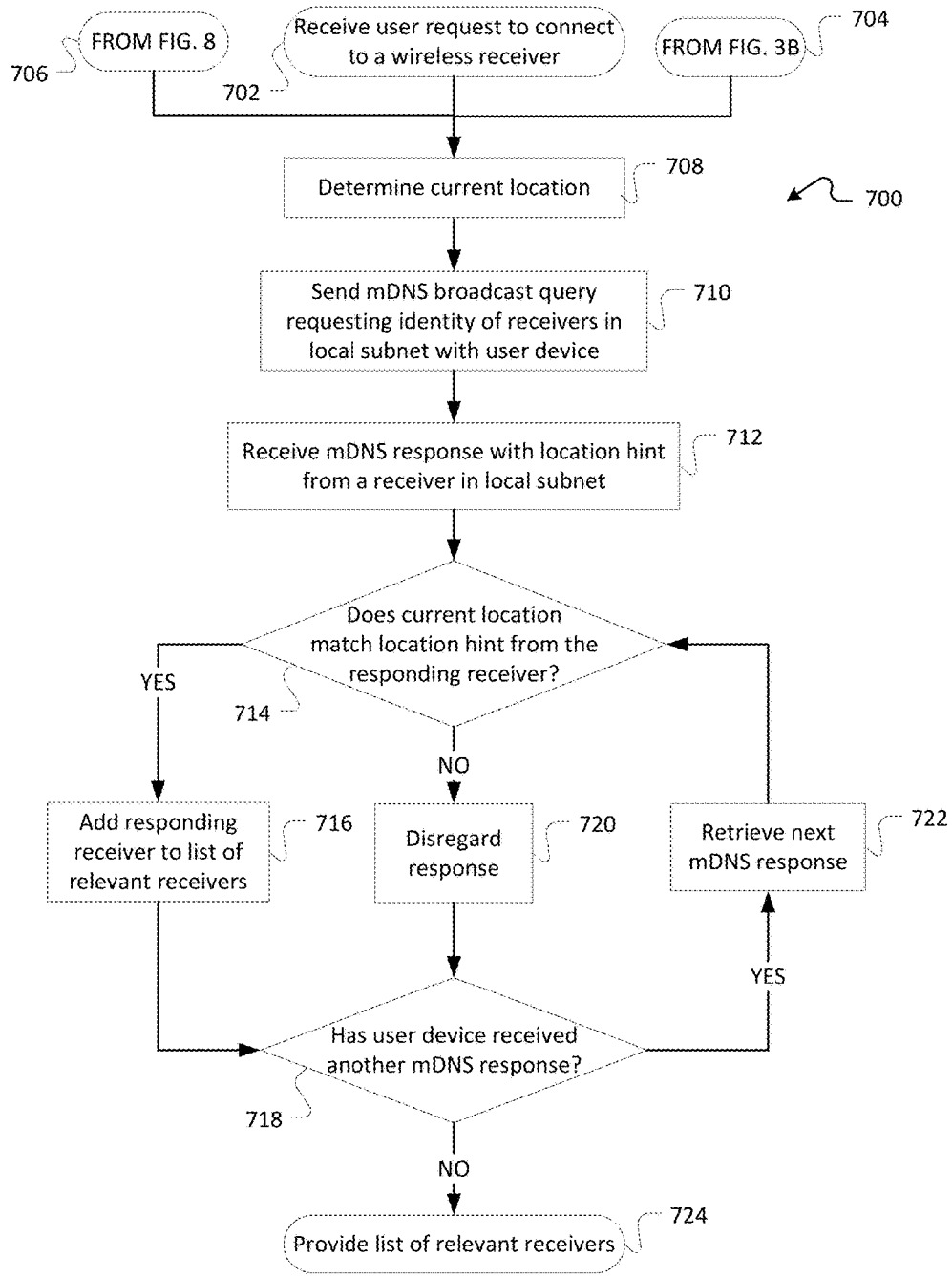
FIG. 7 illustrates an exemplary method for identifying relevant wireless receivers in accordance with embodiments of the present invention.
Figure 8:
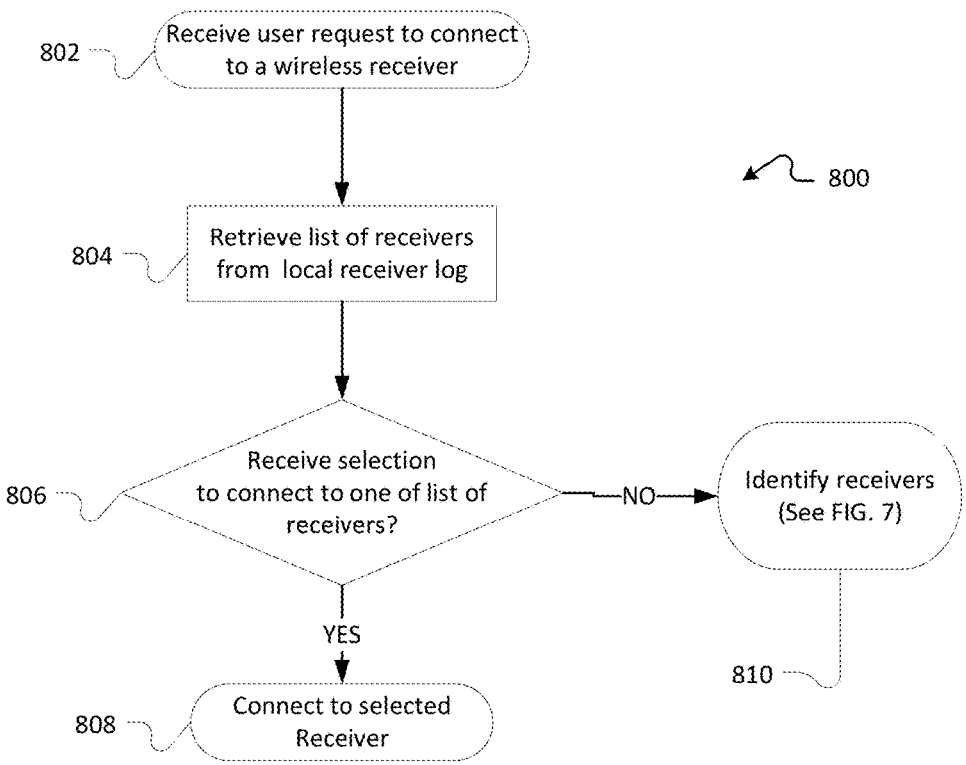
FIG. 8 illustrates an exemplary method for identifying available wireless receivers in accordance with embodiments of the present invention.

FIGS. 7-8 illustrate various ways to automatic discover relevant wireless receivers within a system that uses Miracast over Infrastructure, such as system 200 in FIG. 2. As should be appreciated, FIGS. 7-8 are described for purposes of illustrating the present methods and systems and are not intended to limit the disclosure to a particular sequence of steps or a particular combination of hardware or software components.

Method 700 in FIG. 7 may begin in a number of ways. In an embodiment, when a device receives a user request to connect to a wireless receiver, the smart discovery program may run through method 330 to determine whether the user has an upcoming or ongoing appointment. If there is no appointment ("NO" at 334 of FIG. 3B), method 700 may begin at step 704. In another embodiment, method 700 may begin at step 702 without performing method 330 when a user request to connect is received. In yet another embodiment, method 700 may begin at step 706 when a user request to connect is received and the user has elected not to connect to any receiver included in a local receiver log as described below with reference to FIG. 8.

Regardless of which way method 700 begins, step 708 determines a current location of the user device. Step 708 may be performed by the location component 216 of the client version of the smart discovery program 214. Current location may be determined in a number of ways based on a variety of sources including without limitation a GPS signal from a sensor in the user device, the identity of a wireless network that the user device may be connected to, self-reported location information from a user, the IP address being used by the user device, a location of a cell tower the user device is connected to, a list of currently visible Wi-Fi networks, and any other means of determining location of a user device.

Step 710 sends an mDNS broadcast (e.g., IP multicast) query whose purpose is to identify a list of all Miracast-compatible receivers within the local logical subnet with the user device. The mDNS query will include a question that asks all Miracast-compatible receivers within the same local subnet to identify themselves. The multicast query includes the device's IP address so that appropriate receivers may respond to the query. The query also contains a query ID. In alternate aspects, step 710 may be omitted if the device has recently issued an equivalent query and it has cached the results it received in response to this query. Cached results can be used if recent enough and if the source device has not changed its location.

At step 712, each receiver that receives the mDNS query and can answer the question contained therein in the affirmative will respond with a mDNS response to the user device that sent the mDNS broadcast query. In accordance with the present invention, each mDNS response will also include a hint that contains location information (whether GPS, LDAP, or something else) about the location of the receiver in the payload of the mDNS response. The mDNS response also includes the query ID so that the computing device may match the response to the query.

Step 714 determines whether the current location of the user device from step 708 matches or is close to the location hint in the mDNS response from the responding receiver. Location matching can be performed in different ways depending on the type of location information in the response. For example, if the location hint contains physical coordinates (GPS) then the proximity/location matching will be performed by verifying that the source device's position is within a certain radius/distance/range of the coordinates of the receiver in the response. As another example, if the location hint in the response contains building/floor/room information, proximity/location matching can be determined by matching building and floor, depending on granularity/resolution of the returned data. That is, if the returned receiver's location contains only building information, location-matching may be determined by just matching the building where the source device (projecting device) is located. If the response contains building and floor data, proximity can be determined by matching both building and floor. The proximity/location matching decision is also influenced by the kind of location information available on the source/projecting device. For instance, the receiver may include GPS location but the source device may not have GPS, and it may be able to get location info only in less reliable ways (e.g. visible wi-fi networks) or only by building/floor location. Furthermore, the location matching decision may account for the level of accuracy (margin of error) of location data on both sides. cIn aspects, the location hint may include an estimate of the accuracy of the location data itself (e.g. "within X meters"). The location-matching decision may factor in this estimate. For example, if a radius/distance/range is 100 meters and the and two devices are 150 meters away from each other, the system would not decide that a receiver is out of range if one of the two locations/positions is given with an accuracy of "within 50 meters" or worse.

Step 714 may be performed by the location component 216 of the smart meeting application 214. If the responding receiver's location hint matches the device's current location ("YES" at 714), the receiver is added to a list of relevant receivers at step 716. If not ("NO" at 720), the receiver is not added to the list and/or the response is ignored or discarded at step 720. Either way, method 700 proceeds to step 718 where it determines whether it has received any other mDNS responses. If so, it retrieves the next response and proceeds to step 714 where it determines, based on location, whether the next receiver should be added to the list of relevant receivers. In this way, the smart discovery program reviews all of the mDNS responses from all the receivers' location in the same subnet and produces a list of only those receivers that are within a close proximity to the user device. Method 700 ends at step 724 where is provides a list of relevant receivers, where the relevant receivers are both available for connection and located in close proximity to the user device.

FIG. 8 illustrates an exemplary embodiment of a method 800 for identifying available Miracast-compatible wireless receivers, particularly those that are located within a different subnet from the user device. At step 800, the system (e.g., smart discovery program 214) receives a request to connect to a wireless receiver. Next step 804 retrieves a list of receivers from the local receiver log (such as log 212), which may include all Miracast-compatible receivers that the device has previously connected to. In aspects, these receivers were logged as part of step 406 in FIG. 4. The list of receivers is presented to the user. If the system receives a selection from the user to connect to one of the listed receivers at step 806, method 800 proceeds to step 808 where the user device connects to the selected receiver. If the device does not receive a selection to connect at step 806, method 800 moves to step 810 where it retrieves a list of receivers from a location other than the local receiver log. The other receivers may include all wireless receivers that are within Wi-Fi range of the user device, or all wireless receivers that are within the same local subnet as the user device (using Miracast over Infrastructure), or all relevant receivers that may be obtained through an embodiment of the present invention illustrated in FIG. 7.

Figure 9:
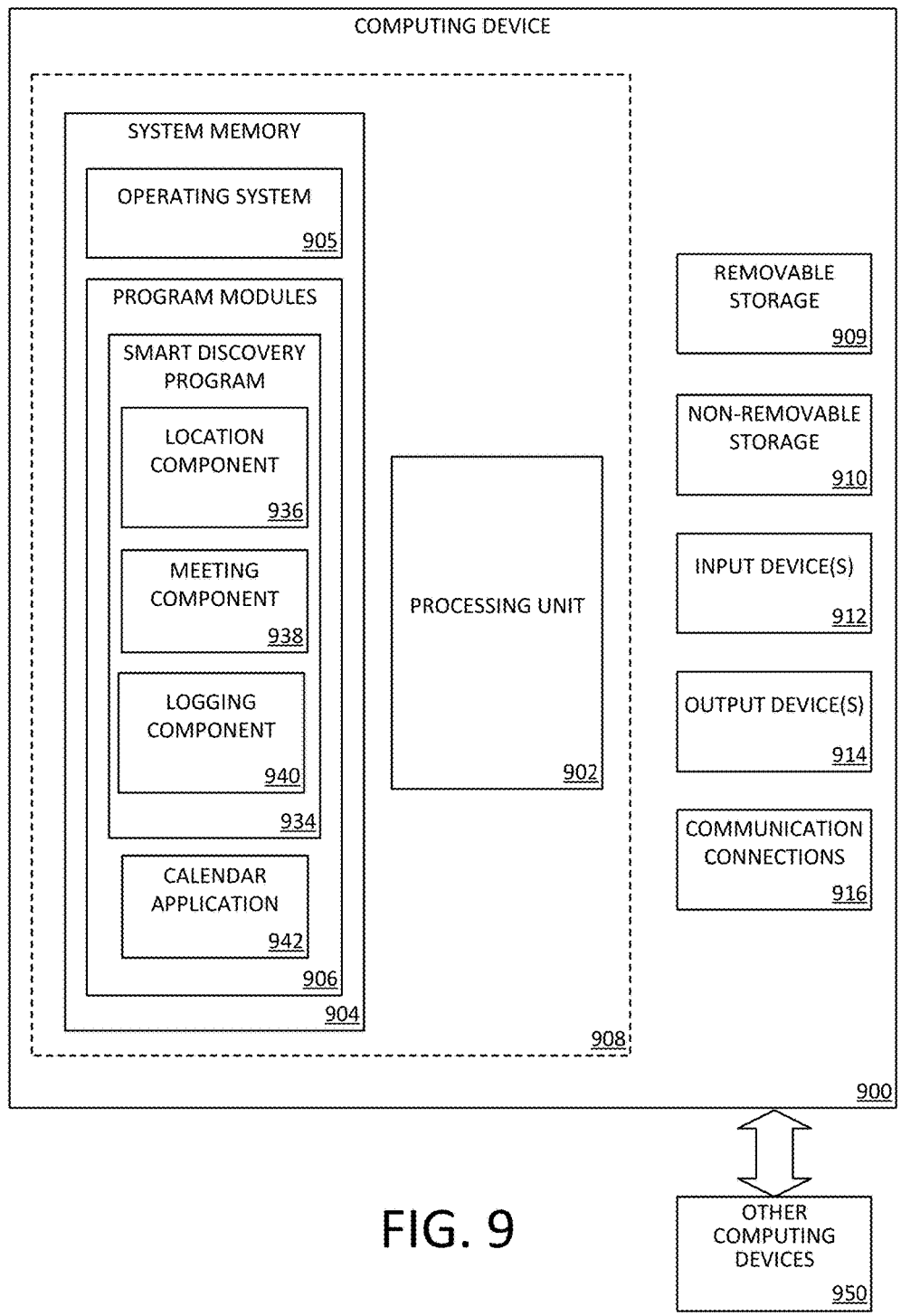
FIG. 9 is a block diagram illustrating example physical components of a computing device with which aspects of the disclosure may be practiced.
Figure 10A:
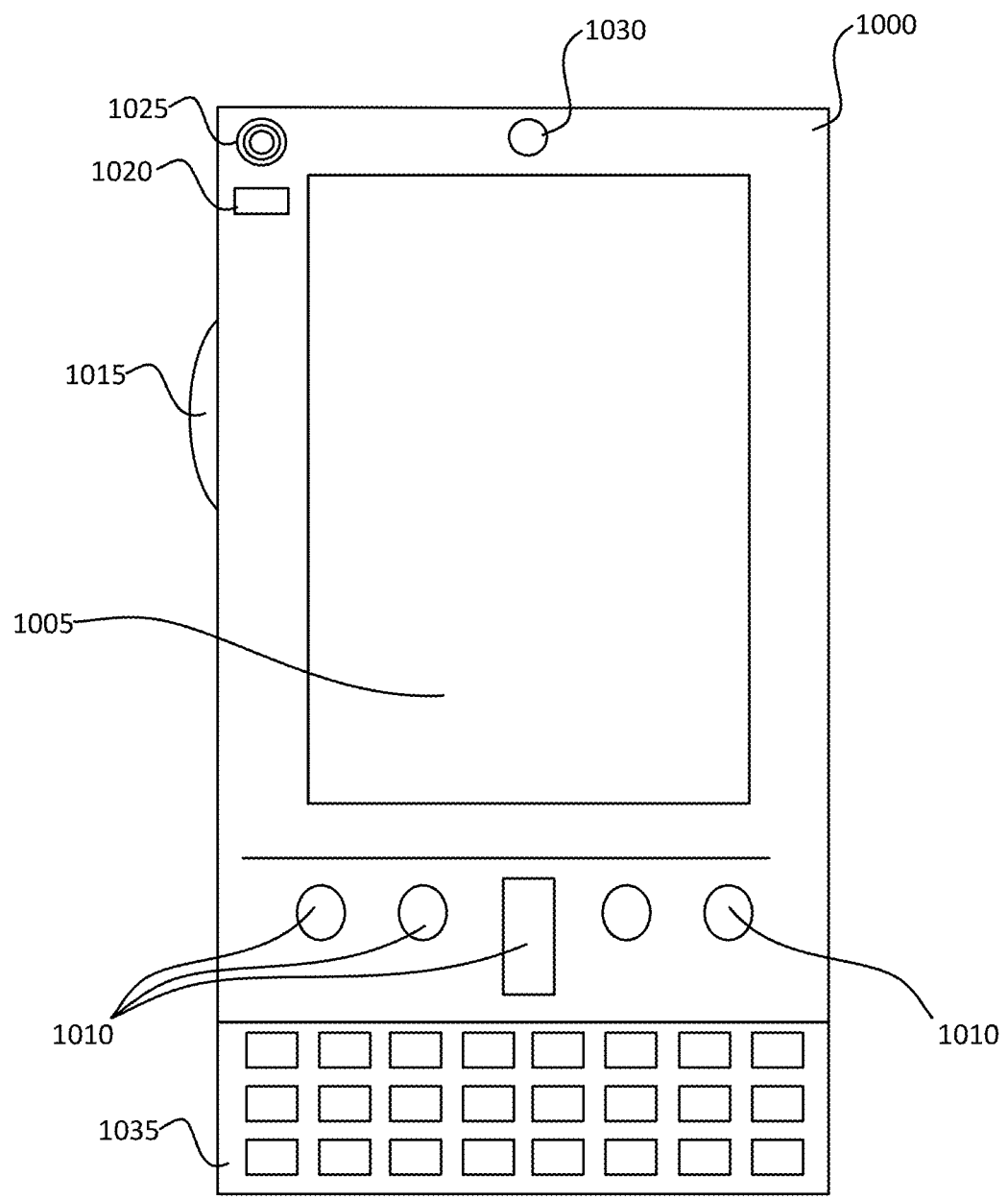
FIGS. 10A and 10B are simplified block diagrams of a mobile computing device with which aspects of the present disclosure may be practiced.
Figure 10B:
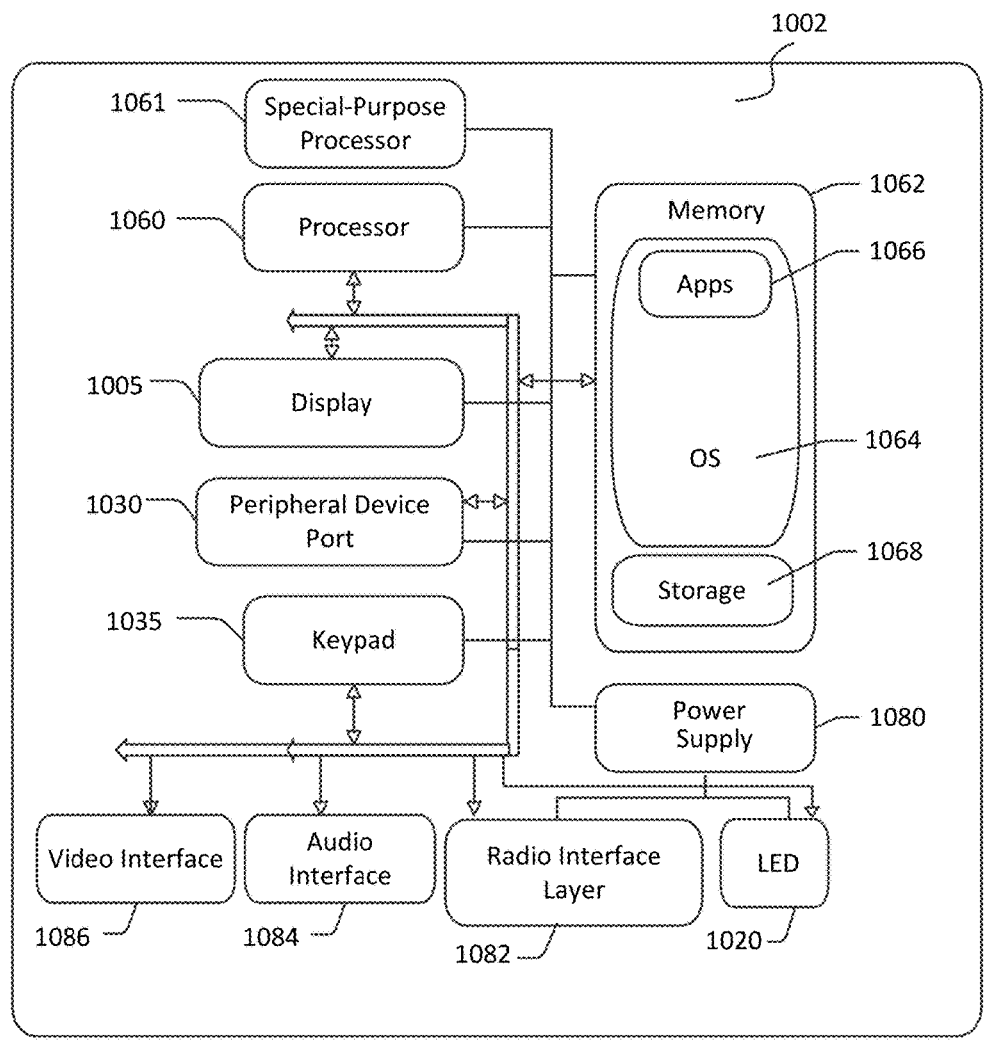
Figure 11:
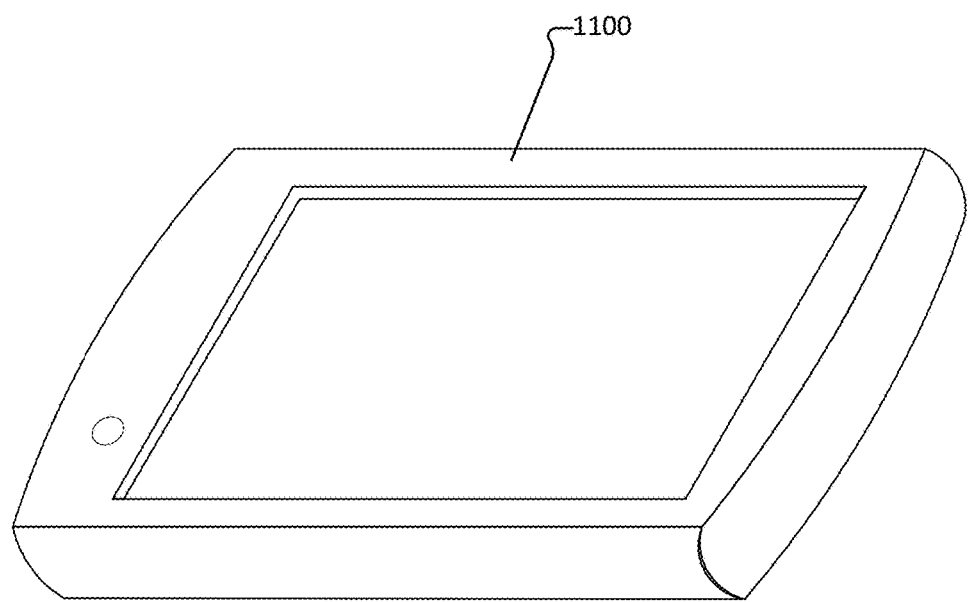
FIG. 11 illustrates a tablet computing device for executing one or more aspects of the present disclosure.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, as described herein.

FIG. 9 is a block diagram illustrating physical components (e.g., hardware) of a computing device 900 with which aspects of the disclosure may be practiced. The computing device components described below may have computer executable instructions for implementing a smart discovery program 920 on a computing device (e.g., server computing device 112 and/or client computing device 104 and 204), including computer executable instructions for smart discovery program 920 that can be executed to implement the methods disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running smart discovery program 934, such as a location component 936, a meeting component 938, and a logging component 940, and a calendar application 942.

The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., smart discovery program 934) may perform processes including, but not limited to, the aspects as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as email or other messages used by an email application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including the instructions for creating and sharing collaborative objects as described herein (e.g., task component, communication component, task product component, collaborative object component, permissions component, and/or UX component, etc.).

The system 1002 has a power supply 1070, which may be implemented as one or more batteries. The power supply 1070 may further include an external power source, such as an AC adapter or a powered docking cradle that supplements or recharges the batteries. The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via an audio transducer 1025 (e.g., audio transducer 1025 illustrated in FIG. 10A). In the illustrated embodiment, the visual indicator 1020 is a light emitting diode (LED) and the audio transducer 1025 may be a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of peripheral device 1030 (e.g., on-board camera) to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

As should be appreciated, FIGS. 10A and 10B are described for purposes of illustrating the present methods and systems and are not intended to limit the disclosure to a particular sequence of steps or a particular combination of hardware or software components.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A computing system for discovering a wireless receiver for a scheduled meeting, wherein the scheduled meeting includes at least one attendee, the computing device comprising:
   a processor;
   memory storing computer-readable instructions that when executed by the processor causes the computing device to:
      receive a notice that the scheduled meeting has started;
      in response to receiving the notice that the scheduled meeting has started:
         retrieve a meeting location for the meeting;
         identify a matching wireless receiver that is associated with the meeting location;
         provide the at least one attendee of the scheduled meeting with an option to connect the computing device to the matching wireless receiver for the scheduled meeting; and
         connect the computing device to the matching wireless receiver using a Miracast protocol when the at least one attendee selects the option to connect.

2. The computing device of claim 1 further comprising computer-readable instructions that when executed by the processor causes the computing device to:
   identify the matching wireless receiver by retrieving an identifier for the matching wireless receiver from a receiver log based on the meeting location.

3. The computing device of claim 2 wherein the receiver log is stored on the computing device.

4. The computing device of claim 1 further comprising computer-readable instructions that when executed by the processor causes the computing device to:
   send the meeting location to a server; and
   receive an identifier for the matching wireless receiver from the server.

5. The computing device of claim 4 further comprising computer-readable instructions that when executed by the processor causes the computing device to:
   store an identifier for the matching receiver in a local receiver log on the computing device.

6. The computing device of claim 5 further comprising computer-readable instructions that when executed by the processor causes the computing device to:
   receive a request from the attendee to connect to a wireless receiver;
   determine that the scheduled meeting has concluded;
   retrieve the identifier for the matching receiver from the local receiver log; and
   provide the attendee a second option to connect the computing device to the matching wireless receiver.

7. The computing device of claim 1 further comprising computer-readable instructions that when executed by the processor causes the computing device to:
   receive an invitation for the scheduled meeting, wherein the invitation comprises the meeting location and a meeting time; and
   retrieve the meeting location for the scheduled meeting from the calendar invitation.

8. The computing device of claim 1 further comprising computer-readable instructions that when executed by the processor causes the computing device to:
   receive a wireless signal from a plurality of wireless receivers, wherein the plurality of wireless receivers includes the matching wireless receiver; and
   limit the option to connect the computing device to the matching wireless receiver.

9. The computing device of claim 1 wherein the Miracast protocol comprises a Miracast over Wi-Fi Direct protocol.

10. A computer-implemented method for identifying one or more relevant wireless receivers in a system comprising a plurality of available wireless receivers connected to a computing device via a network, wherein the method comprises:
    receiving a request to connect the computing device to a wireless receiver;
    determining a current location of the computing device;
    sending a broadcast query seeking an identity of each of the plurality of available receivers, wherein the broadcast query includes a query ID;
    receiving a query response with a location hint and the query ID from one or more responding receivers;
    adding a responding receiver to a list of relevant receivers when the location hint in the query response from the responding receiver matches the current location of the computing device;
    providing the list of relevant receivers to a user of the computing device;
    receiving a request to connect the computing device to a selected receiver, wherein the list of relevant receivers includes the selected receiver; and
    using a Miracast protocol to connect the computing device to the selected receiver.

11. The computer-implemented method of claim 10 further comprising:
    determining that the location hint in the query response matches the current location when the location hint references a receiver location that is in close physical proximity to the current location.

12. The computer-implemented method of claim 11 wherein the receiver location is in close physical proximity to the current location when the distance between the receiver location and the current location is less than 100 feet.

13. The computer-implemented method of claim 12 further comprising:
   determining that the location hint in the query response matches the current location when the current location is a building and the location hint references the building.

14. The computer-implemented method of claim 11 further comprising:
   storing an identifier for the selected receiver in a receiver log on the computing device.

15. The computer-implemented method of claim 11 further comprising:
   sending the current location of the computing device and a location associated with the location hint for the responding receiver to a server in the network.

16. The computer-implemented method of claim 11 wherein the request to connect is a voice-initiated request.

17. A computing device comprising:
   a processor; and
   memory storing computer-readable instructions that when executed by the processor cause the computing device to:
   (a) receive a request from a user of the computing device to connect to a wireless receiver;
   (b) determine whether the user has an appointment at a current time;
   (c) when it is determined that the user has an appointment at the current time:
      (c1) retrieve an appointment location for the appointment;
      (c2) identify a matching wireless receiver that is associated with appointment location;
      (c3) provide an option to the user to connect the computing device to the matching wireless receiver; and
   (d) when it is determined that the user does not have an appointment at the current time:
      (d1) determine a current location of the computing device;
      (d2) send a broadcast query seeking an identity of one or more available receivers, wherein the broadcast query includes a query ID;
      (d3) receive a query response with a location hint and the query ID from one or more responding receivers;
      (d4) add a responding receiver to a list of relevant receivers when the location hint in the query response from the responding receiver matches the current location of the computing device; and
      (d5) provide the list of relevant receivers to the user of the computing device.

18. The computing device of claim 17 further comprising computer-readable instructions that when executed by the processor cause the computing device to:
   (c4) use a Miracast protocol to connect the computing device to the matching wireless receiver when the user selects the option to connect.

19. The computing device of claim 17 further comprising computer-readable instructions that when executed by the processor cause the computing device to:
   (d6) receive a request to connect the computing device to a selected receiver, wherein the list of relevant receivers includes the selected receiver; and
   (d7) use a Miracast protocol to connect the computing device to the selected receiver.

20. The computing device of claim 19 further comprising computer-readable instructions that when executed by the processor cause the computing device to:
   (d8) store the selected receiver in a local receiver log on the computing device.

\* \* \* \* \*